Sept. 11, 1951 H. J. LIPKIN 2,567,851
PULSE-BLOCKING CIRCUIT
Filed Aug. 1, 1945 2 Sheets-Sheet 1

INVENTOR
HARRY J. LIPKIN
BY William D. Hall
ATTORNEY

Sept. 11, 1951 H. J. LIPKIN 2,567,851

PULSE-BLOCKING CIRCUIT

Filed Aug. 1, 1945 2 Sheets-Sheet 2

INVENTOR

HARRY J. LIPKIN

BY William D. Hall

ATTORNEY

Patented Sept. 11, 1951 2,567,851

UNITED STATES PATENT OFFICE 2,567,851

PULSE-BLOCKING CIRCUIT

Harry J. Lipkin, Dorchester, Mass., assignor, by mesne assignments, to the United States of America as represented by the Secretary of War Application August 1, 1945, Serial No. 608,315

5 Claims. (Cl. 250—27)

This invention relates in general to electrical circuits and more particularly to electrical pulse-generating circuits.

For some purposes in radio pulse communication it is desired to generate a pulse of a given shape, the time of starting of this pulse being dependent upon the time of application of a trigger pulse to the circuit. In certain types of radio object-detection apparatus, and in other instances, this trigger pulse emanates from a series of thermionic tube amplifier stages the overall bandwidth of which is narrow with respect to the bandwidth of an appreciable portion of the energy contained in the trigger pulse. One reason for using a relatively narrow overall bandwidth is the necessity in some instances for a high gain in the trigger pulse amplifier stages. Since relatively wide stage bandwidth may be sacrificed for a higher gain, the overall bandwidth is often relatively narrow in such circuits. The important effects resulting from such a relatively narrow overall bandwidth are twofold. Firstly, the output pulse from these stages is greatly distorted with respect to the input pulse. Secondly, the transient response of these stages is such that a few cycles of damped oscillations may be added onto the pulse, the amplitude of the first few of these waves often being of the same order of magnitude as that of the main pulse. These oscillations are undesirable in that they contain information other than that embodied in the main pulse. Accordingly, the circuits into which this trigger pulse feeds must be such that they are insensitive to the aforementioned oscillations.

Among the objects of the present invention, therefore, are:

1. To provide electrical circuits for the generation of pulses;
2. To provide such circuits which may be synchronized by a trigger pulse; and
3. To provide such circuits which are substantially insensitive to oscillations which may occur in the wake of such a trigger pulse.

In accordance with the present invention there are illustrated several embodiments of a triggered pulse-generating circuit. One embodiment provides a triggered multivibrator with one tube normally non-conducting. The substantially rectangular pulse output of the multivibrator is coupled to an amplifier tube biased beyond cutoff. This pulse does not appear at the output of the amplifier tube until the associated input capacitance of the tube is partially charged, and so a time delay is obtained.

Another embodiment of the circuit provides a multivibrator with one tube caused to be non-conducting by the impressing of a positive potential on its cathode. Unbypassed resistors are placed in the cathode circuits of both tubes, and the output is taken from one of these cathode resistors.

Still another embodiment provides a multivibrator having a normally non-conducting tube. The output of the multivibrator is coupled through a diode to an amplifier tube. A pulse with oscillations following it may be fed to the multivibrator, in which case the output of the amplifier does not contain the oscillations, and also preserves the original pulse length.

There is also described a multivibrator circuit with the grid of one of the tubes connected to a point of negative potential, so as to render this tube normally non-conductive. A negative trigger pulse applied to the grid of the normally-conducting tube cuts this tube off and turns the former tube on. After a time dependent upon the constants of the circuit the multivibrator switches back to its quiescent condition. A substantially rectangular pulse is generated thereby, the length of which is dependent upon the constants of the circuit.

This invention will best be understood by reference to the drawings, in which.

Figure 1:
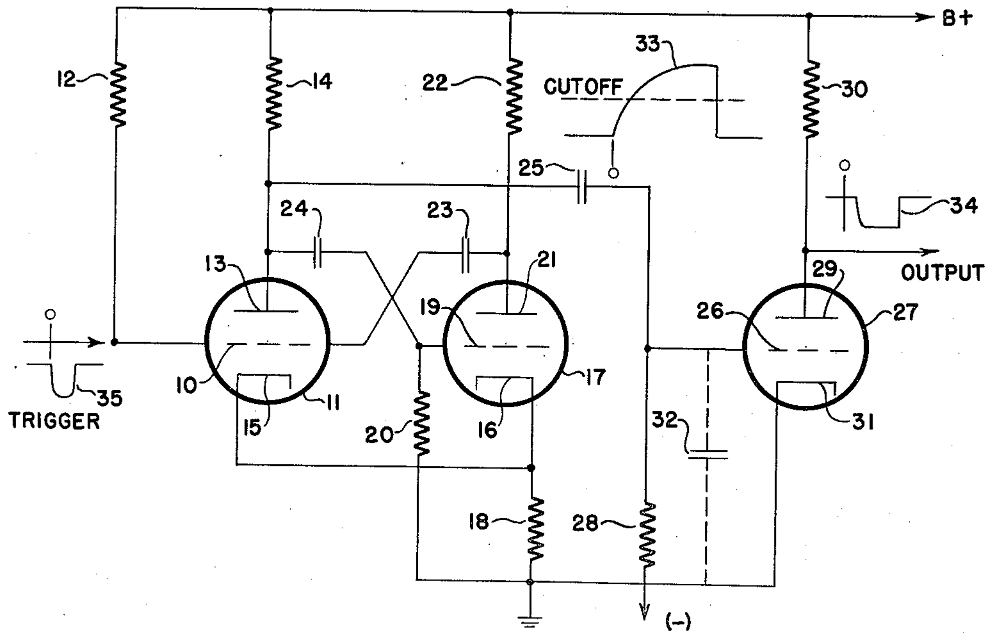
Fig. 1 is a circuit diagram of a triggered multivibrator and amplifier having a time delay.

Referring now to a description of the invention and to Fig. 1, the trigger pulse 35, which is labeled as such, is coupled to the grid 10 of the normally-conducting tube 11 of the multivibrator. This grid is returned to a point of positive potential, B+, through grid-leak resistor 12. The plate 13 is connected to B+ through plate load resistor 14. The cathode 15 of tube 11 is connected directly to the cathode 16 of the normally non-conducting tube 17 of the multivibrator, and both cathodes are tied to ground through resistor 18. The grid 19 of tube 17 is also connected to ground through grid-leak resistor 20. The plate 21 of tube 17 is connected to B+ through plate load resistor 22, and is coupled back to the grid of tube 11 by condenser 23. The plate of tube 11 is coupled to the grid of tube 17 by condenser 24.

The output of the multivibrator, shown as pulse 33, is taken from the plate of tube 11, and is coupled through condenser 25 to the grid 26 of amplifier tube 27. The grid of this tube is tied to a point of negative potential through grid-leak resistor 28. The plate 29 of tube 27 is connected to B+ through plate load resistor 30, and the cathode 31 is grounded. The input capacitance of tube 27 plus the pertinent wiring capacitance is represented by condenser 32. The output pulse, shown as pulse 34, is taken from the plate of tube 27. The time axis marked "0" on pulses 35, 33 and 34 represents the time of occurrence of the leading edge of the trigger pulse 35.

Figure 2:
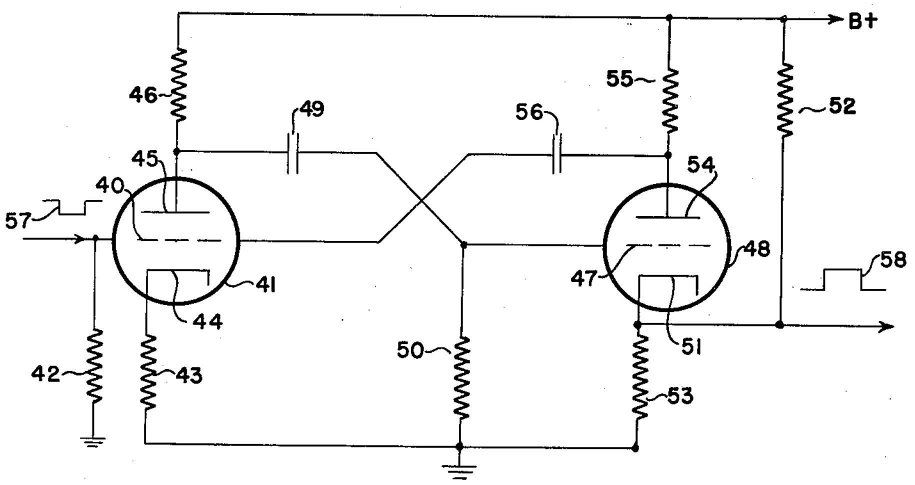
Fig. 2 is a circuit diagram of a triggered multivibrator.

Referring now to Fig. 2, a negative pulse 57, as noted, is coupled to the grid 40 of the normally-conducting tube 41 of the multivibrator. This grid is tied to ground through grid-leak resistor 42. The cathode 44 of tube 41 is connected to ground through cathode resistor 43. The plate 45 is connected to a point of positive potential, B+, through plate load resistor 46, and is coupled to the grid 47 of the normally non-conducting tube 48 of the multivibrator through condenser 49. This grid 47 is tied to ground through grid-leak resistor 50. The cathode 51 of tube 48 is held at a positive potential by a voltage divider, connected between B+ and ground, consisting of resistors 52 and 53 respectively. The plate 54 of this tube is connected to B+ through plate load resistor 55, and is coupled back to the grid of tube 41 through condenser 56. The pulse output 58 of the circuit, as noted, is taken from the cathode 51.

Figure 3:
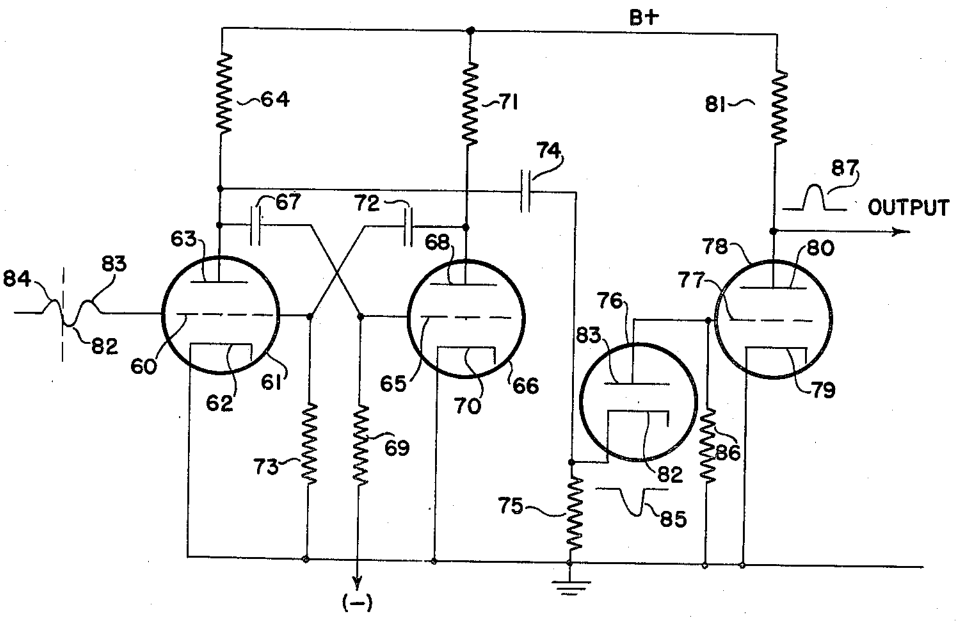
Fig. 3 is a circuit diagram of an arrangement which substantially maintains the input pulse length.

In the embodiment of Fig. 3 the input pulse 84, with trailing oscillations 82 and 83, is coupled to the grid 60 of the normally-conducting tube 61 of a multivibrator. This grid is tied to ground through grid-leak resistor 73 and the cathode 62 of tube 61 is grounded. The plate 63 is connected to a point of positive potential, B+, through plate load resistor 64, and is coupled to the grid 65 of the normally non-conducting tube 66 of the multivibrator through condenser 67. The grid 65 of tube 66 is tied to a point of negative potential through grid-leak resistor 69. The cathode 70 of this tube is grounded. The plate 68 of this tube is connected to B+ through plate load resistor 71, and is coupled back to the grid of tube 61 through condenser 72.

The output of the multivibrator is taken from the plate of tube 61, and is coupled through condenser 74 to grid-leak resistor 75, where it appears as pulse 85. The voltage across resistor 75 is coupled through a diode 76 to the grid 77 of an amplifier tube 78. The cathode 82 of the diode 76 is connected to resistor 75, while the plate 83 is connected to the grid of tube 78, which is tied to ground through grid-leak resistor 86. The cathode 79 of amplifier tube 78 is grounded and the plate 80 is connected to B+ through plate load resistor 81. The output of the circuit, pulse 87, is taken from the plate of the amplifier tube.

Figure 4:
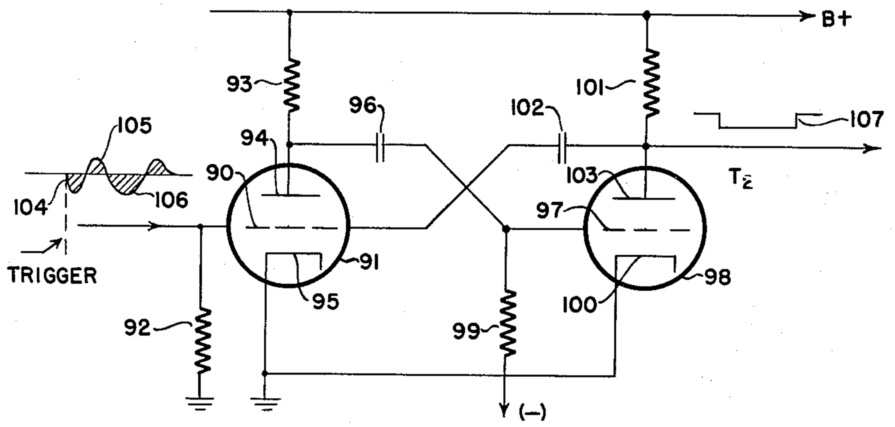
Fig. 4 is a circuit diagram of a triggered multivibrator.

Fig. 4 is a circuit diagram of another type of triggered multivibrator. A negative trigger pulse 104, with oscillations 105 and 106, is applied to the grid 90 of the normally-conducting tube 91 of the multivibrator. This grid is tied to ground through grid-leak resistor 92. The cathode 95 of tube 91 is grounded, and the plate 94 is connected to a point of positive potential, B+, through plate load resistor 93. The plate 94 is also coupled through condenser 96 to the grid 97 of the normally non-conducting tube 98 of the multivibrator. The grid of tube 98 is tied to a point of negative potential through grid-leak resistor 99, and the cathode 100 is grounded. The plate 103 of this tube 98 is connected to B+ through plate load resistor 101, and is coupled back to the grid of tube 91 through condenser 102. The output pulse 107 is shown as being taken from the plate of tube 98.

The circuit of Fig. 1 is designed so that the output pulse will be formed at a small time delay with respect to the input pulse. Due to the positive grid return of tube 11, this tube will be normally highly conducting. The current in this tube also flows through resistor 18, keeping the cathode of this tube, and the cathode of tube 17, at a positive potential. The cathode voltage of tube 17 may be sufficient to cut it off. Thus under normal conditions tube 11 will be highly conducting, while tube 17 will be non-conducting.

A negative input pulse, or trigger 35, lowers the grid potential of tube 11 and raises the plate potential thereof. This increase is coupled to the grid of tube 17, which is also increased in voltage. This causes a decrease in voltage on the plate of tube 17, which is coupled back to the grid of tube 11. This cumulative action causes a rapid switching to occur in the multivibrator, with the result that tube 11 becomes non-conducting, and tube 17 becomes conducting. This situation remains until the potential of the grid of tube 17, which is steadily decreasing, reaches cutoff potential, at which time there is another rapid switching action which is the reverse of the first such action described, and the normal conditions are resumed with tube 11 conducting and tube 17 non-conducting.

The output pulse of the multivibrator is taken from the plate of tube 11 and has a shape substantially like that shown at 33. The waveform 33 does not build up to its maximum voltage instantaneously, but must first charge up the capacitance 32. It is noted that the leading edge of the pulse is sloping, the shape being exaggerated in waveform 33 for clarity. Since the grid of amplifier tube 27 is biased beyond cutoff, the potential of this grid must be raised a certain amount before this tube starts conduction. This grid potential cannot be raised instantaneously, but first the input capacitance of tube 27 must be charged to the correct potential. Thus there is a slight delay in the appearance of an output pulse 34 from the amplifier over the time the trigger pulse 35 first is applied to the input, this delay being due to the time it takes to charge this input capacitance to such a value that the grid reaches the cutoff potential. It is noted that the leading edge of wave 34 occurs a short time after the time marked "o," which is the time the leading edge of pulse 35 occurs.

One use for the abovementioned type of circuit is in a pulse communication system which is being operated in the near vicinity of a high-powered pulse transmitter. In this case it is necessary that the pulses from the nearby pulse transmitter be not able to be detected by the receiver containing this circuit. The is usually accomplished by turning off some of the receiver stages by means of a negative blanking pulse which is synchronized by the pulse from the pulse transmitter. This negative blanking pulse may be applied to the grids of these stages, and be of such an amplitude as to cut the associated tubes off. In order that the received pulse from the pulse transmitter not affect the receiver for even a small amount of time, the use of some such circuit as the abovementioned is necessary. The blanking pulse will then have enough time to turn off some of the receiver stages before the received pulse reaches these stages.

The circuit of Fig. 2 is another embodiment of a multivibrator-type pulse generator. A voltage divider from a point of positive potential B+, to ground, consisting of resistors 52 and 53 holds the cathode of tube 48 at a positive potential, so that this tube is normally non-conducting. The other tube 41 of the multivibrator is normally-conducting. A negative pulse 57, as shown, is applied to the grid of tube 41, and by the conventional multivibrator action described in connection with Fig. 1, a condition quickly results in which tube 41 is non-conducting and tube 48 is conducting. This condition, which lasts for an amount of time which is dependent upon the circuit constants, exists until the voltage on the grid of tube 48, which is steadily decreasing, reaches cutoff, at which time the circuit quickly assumes the normal operating condition again. The output pulse 58 in this case is taken from the cathode of tube 48, which provides a low impedance output. It is understood, however, that the output may be taken from other points in the circuit.

One use of the circuit of Fig. 2 is in a pulse communication system which responds to groups of two pulses, the spacing of the pulses being of a certain given time duration. The circuit shown is incorporated in a receiver which is adapted to receive the first of the two pulses and to use it to trigger the multivibrator. The length of the generated pulse is made substantially equal to the aforementioned given time duration. This pulse may then be sent through an inverter stage and be used to turn on several stages of a second receiver which will be adapted to receive the second of the transmitted pulses. The length of the generated pulse is determined by the constants of the multivibrator circuit.

The circuit of Fig. 3 provides an output pulse which is substantially of the same time duration as the input pulse. The circuit also is insensitive to any oscillations which may occur after the original positive pulse. Tube 61 is the normally-conducting and tube 66 is the normally non-conducting tube of a triggered multivibrator. Let us assume that the input pulse is of the shape shown, with the main portion 84 of the pulse being positive. Since it is applied to the normally-conducting tube, this pulse goes through the multivibrator without causing a switching action therein, and appears across resistor 75 as a negative pulse 85. Since this pulse is negative, conduction will occur in diode 76, and the pulse will be coupled to the grid of tube 78, and will appear on the plate of this tube as a positive pulse 87 of substantially the same length as the first positive portion 84 of the input pulse.

The negative portion 82 of the input pulse will start the conventional multivibrator switching action, with the condition then being one with tube 61 non-conducting and tube 66 conducting. Accordingly, a positive pulse is generated at the plate of tube 61 and will appear across resistor 75, but this will not be coupled to tube 78, since the diode 76 will not conduct with its cathode at such a high positive potential. The second positive portion 83 of the input pulse is usually too small to be of consequence, since a relatively large positive pulse at the grid of tube 61 is needed at this point in the operation to cause the switching action to again occur.

The multivibrator circuit of Fig. 4 produces an output pulse 107 the leading edge of which starts substantially at the time an input negative pulse 104 is applied. This circuit is insensitive to any oscillations which may occur after the trigger pulse 104. Tube 98 is normally non-conducting due to the negative bias placed on its grid, and tube 91 is normally-conducting. The negative input pulse 104 starts the conventional multivibrator switching action, so that substantially as soon as this pulse is applied tube 91 becomes non-conducting and tube 98 becomes conducting.

The incoming pulse may have oscillations 105 and 106 following it. As a result of the violent switching action of the circuit, however, the grid of tube 91 will be held at a potential far below cutoff, so positive pulse 105 of the oscillations will have no effect on the operation of the circuit. Negative pulse 106 will cause no switching action to occur because tube 91 is non-conducting. The time duration of the output pulse 107, shown negative for an example, will depend upon the constants of the circuit.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pulse-blocking circuit comprising a quiescently-conducting first vacuum tube having a cathode, anode, and at least one grid, the grid of said first vacuum tube being coupled to a point of positive potential; a second vacuum tube having a cathode, anode, and at least one grid, cathode-coupled to said first vacuum tube, whereby said second vacuum tube is quiescently cut off; a first capacitance means coupling the plate of said first vacuum tube to the grid of said second vacuum tube; a second capacitance means coupling the plate of said second vacuum tube to the grid of said first vacuum tube; means coupled to said first vacuum tube, for applying a first pulse from a source external to said circuit onto said circuit, whereby said first vacuum tube becomes cut off for a period of time and said second vacuum tube becomes conductive for substantially the same period of time, whereby a positive second pulse is formed at the plate of said first vacuum tube; a third vacuum tube having a cathode, anode, and at least one grid, coupled to the plate of said first vacuum tube, the grid of said third vacuum tube being connected to a point of negative potential, whereby said third vacuum tube is cut off in the absence of a first pulse; a third capacitance means connected between the input of said third vacuum tube and ground; whereby a third pulse is formed at the output of said third vacuum tube and the formation of said third pulse is delayed a period of time from the formation of said first pulse.

2. A pulse-blocking circuit comprising a quiescently-conducting first vacuum tube having a cathode, anode, and at least one grid; a second vacuum tube having a cathode, anode, and at least one grid; biasing means for applying a voltage to said second vacuum tube; whereby said second vacuum tube is quiescently cut off; first capacitance means coupling the plate of said first vacuum tube to the grid of said second vacuum tube; second capacitance means coupling the plate of said second vacuum tube to the grid of said first vacuum tube; means applying a positive first pulse with oscillations thereafter from a point external to said circuit to the grid of said first vacuum tube; a third vacuum tube having a cathode, anode, and at least one grid; a diode vacuum tube coupling the plate of said first vacuum tube to the grid of said third vacuum tube, whereby said first pulse appears at the output of said third vacuum tube; whereby said oscillations after said first pulse cause said first vacuum tube to be cut off for a period of time and cause said second vacuum tube to conduct for substantially the same period of time, causing a positive second pulse to be started at the plate of said first vacuum tube substantially at the time said oscillations start, rendering said diode vacuum tube impervious to current flow therethrough.

3. A pulse-blocking circuit including a one-shot multivibrator comprising a first vacuum tube, a second vacuum tube, said vacuum tubes being capacitively coupled to one another, said first vacuum tube being adapted to respond to a triggering pulse of electrical energy, which may be accompanied by undesired random pulses, and means for biasing said vacuum tubes so as to cause said first vacuum tube to be normally conducting and said second vacuum tube to be normally cut-off; a third vacuum tube having a cathode, anode, and at least one control grid, said control grid being coupled through a coupling capacitor to the output of said first vacuum tube; whereby the action of said multivibrator serves to prevent any response of said third vacuum tube to said random pulses after the occurrence of said triggering pulse, during a cycle of operation of said one-shot multivibrator.

4. A pulse-blocking circuit as set forth in claim 3 wherein said third vacuum tube is normally cut-off and has an integrating circuit including the grid to cathode interelectrode capacitance of said third vacuum tube, which serves to delay its response to said triggering pulse for a given period of time.

5. A pulse-blocking circuit as set forth in claim 3, and also including a diode vacuum tube having a cathode connected to said coupling capacitor and an anode connected to the grid of said third vacuum tube, resistive means being connected from the grid of said third vacuum tube to ground, said third vacuum tube being normally conductive, whereby only the positive initial input pulse coupled to said first vacuum tube will be amplified by said third vacuum tube, the subsequent action of said multivibrator and said diode serving to prevent response of said third vacuum tube to later input signals.

HARRY J. LIPKIN.

REFERENCES CITED

The following references are of record in the file of this patent:

UNITED STATES PATENTS

| Number | Name | Date |
|---|---|---|
| 2,211,750 | Humby | Aug. 20, 1940 |
| 2,366,076 | Wilbur | Dec. 26, 1944 |
| 2,373,145 | Sensiper | Apr. 10, 1945 |
| 2,402,917 | Miller | June 25, 1946 |
| 2,443,922 | Moore | June 22, 1948 |
| 2,444,429 | Cleeton | July 6, 1948 |

OTHER REFERENCES

"Time Bases" by O. S. Puckle, Journal of the Institution of Electrical Engineers. Part III, Communication Engineering, June 1942, page 110.